US011981325B2

(12) United States Patent
Fujiwara et al.

(10) Patent No.: US 11,981,325 B2
(45) Date of Patent: May 14, 2024

(54) CONTROL DEVICE AND MOVEMENT CONTROL SYSTEM

(71) Applicant: HONDA MOTOR CO., LTD., Tokyo (JP)

(72) Inventors: Tatsuro Fujiwara, Tokyo (JP); Akiko Sato, Tokyo (JP); Junpei Noguchi, Tokyo (JP); Gaku Shimamoto, Tokyo (JP); Takeshi Sasajima, Tokyo (JP); Hiroki Takaku, Tokyo (JP); Masafumi Sagara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 18/085,948

(22) Filed: Dec. 21, 2022

(65) Prior Publication Data
US 2023/0192072 A1    Jun. 22, 2023

(30) Foreign Application Priority Data

Dec. 22, 2021    (JP) ................................ 2021-207820

(51) Int. Cl.
*B60W 30/06*    (2006.01)
*G05D 1/00*    (2024.01)

(52) U.S. Cl.
CPC ........... *B60W 30/06* (2013.01); *G05D 1/0016* (2013.01); *B60W 2540/215* (2020.02)

(58) Field of Classification Search
CPC ............ B60W 30/06; B60W 2540/215; G05D 1/0016; B62D 15/0285; G05B 19/0423; G05B 2219/25257
See application file for complete search history.

(56) References Cited

U.S. PATENT DOCUMENTS

2022/0029744 A1*    1/2022   Naiki ....................... H04L 1/08

FOREIGN PATENT DOCUMENTS

JP        2019-089403 A      6/2019

* cited by examiner

*Primary Examiner* — Daryl C Pope
(74) *Attorney, Agent, or Firm* — Paratus Law Group, PLLC

(57) ABSTRACT

A control device includes: a retry determination unit configured to determine whether to execute retry control based on a current position of a moving object and a target position when the moving object is moved to the target position by automatic steering; and a notification control unit configured to transmit a retry notification, including information indicating that the retry control is to be executed based on a determination result of the retry determination unit, to a terminal device. The notification control unit transmits the retry notification to the terminal device when the retry control, executed after at least a part of the moving object reaches the target position, is determined, and the notification control unit does not transmit the retry notification to the terminal device when the retry control, executed before at least a part of the moving object reaches the target position, is determined.

10 Claims, 9 Drawing Sheets

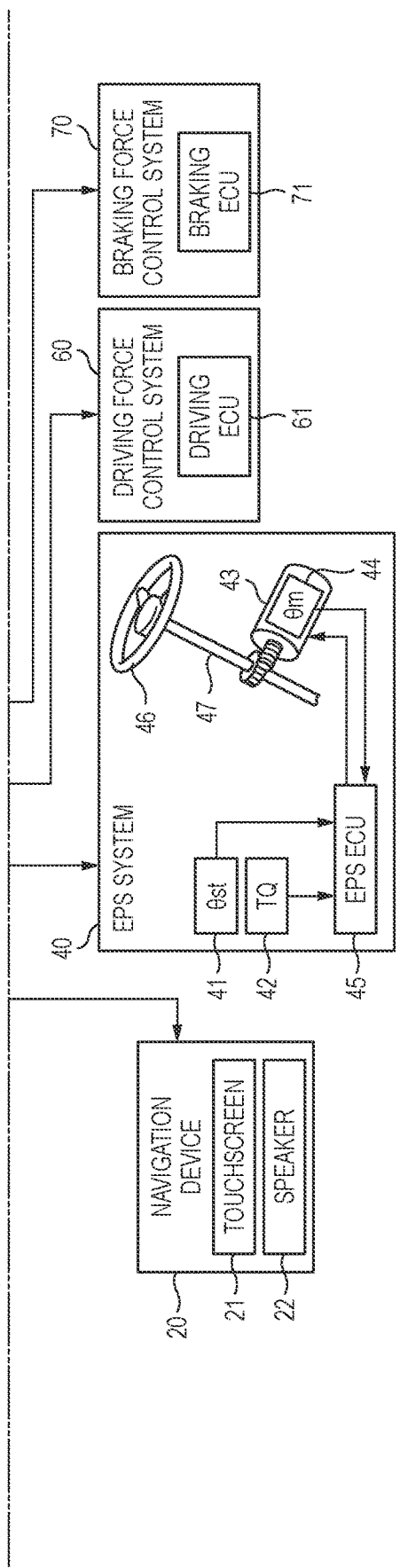

CONTROL DEVICE AND MOVEMENT CONTROL SYSTEM

CROSS-REFERENCE TO RELATED APPLICATIONS

The present application claims the benefit of priority of Japanese Patent Application No. 2021-207820, filed on Dec. 22, 2021, the content of which is incorporated herein by reference.

TECHNICAL FIELD

The present disclosure relates to a control device and a movement control system.

BACKGROUND ART

In recent years, improvements in traffic safety are required to make cities and human settlements inclusive, safe, resilient, and sustainable. From a viewpoint of improving the traffic safety, a driving assistance technique and an automatic driving technique for a moving object (for example, a vehicle) have been developed. For example, JP-A-2019-089403 described below discloses a technique of performing automatic parking in which a vehicle is automatically parked in a parking space in response to an operation of a terminal device carried by a driver who gets off the vehicle. Further, JP-A-2019-089403 described below also discloses a technique in which, during the automatic parking, a content of next behavior of the vehicle is announced by a voice prior to a timing at which the behavior is started.

However, from a viewpoint of issuing a notification necessary for the user while preventing excessive notifications that may bother the user, there is room for improvement in the related art.

SUMMARY

The present disclosure provides a control device and a movement control system that can issue a notification necessary for a user while preventing excessive notifications that may bother the user.

According to a first aspect of the present disclosure, there is provided a control device that is configured to communicate with a terminal device outside a moving object, and that causes the moving object to move to a target position by automatic steering in response to a predetermined movement operation being performed on the terminal device, the control device including: a retry determination unit configured to determine whether to execute retry control, which is for moving the moving object to the target position again after a traveling direction of the moving object is temporarily reversed, based on a current position of the moving object and the target position when the moving object is moved to the target position by automatic steering: and a notification control unit configured to transmit a retry notification, including information indicating that the retry control is to be executed based on a determination result of the retry determination unit, to the terminal device, where: the notification control unit transmits the retry notification to the terminal device when the retry control, executed after at least a part of the moving object reaches the target position, is determined; and the notification control unit does not transmit the retry notification to the terminal device when the retry control, executed before at least a part of the moving object reaches the target position, is determined.

According to a second aspect of the present disclosure, there is provided a movement control system including: the control device according to the first aspect; the moving object that is controlled by the control device, and that is configured to move to the target position by automatic steering in response to the movement operation being performed on the terminal device; and the terminal device including a display unit and configured to communicate with the control device, in which the control device transmits, to the terminal device, the retry notification for causing the display unit to display a retry confirmation screen including information indicating that the retry control is executed, and in which when receiving the retry notification, the terminal device displays the retry confirmation screen on the display unit, and when receiving a predetermined permission operation after the retry confirmation screen is displayed, the terminal device transmits the retry permission to the control device, and displays a movement operation reception screen for receiving the movement operation on the display unit.

According to the present disclosure, it is possible to provide a control device and a movement control system that can issue a notification necessary for a user while preventing excessive notifications that may bother the user.

DESCRIPTION OF EMBODIMENTS

Figure 1:
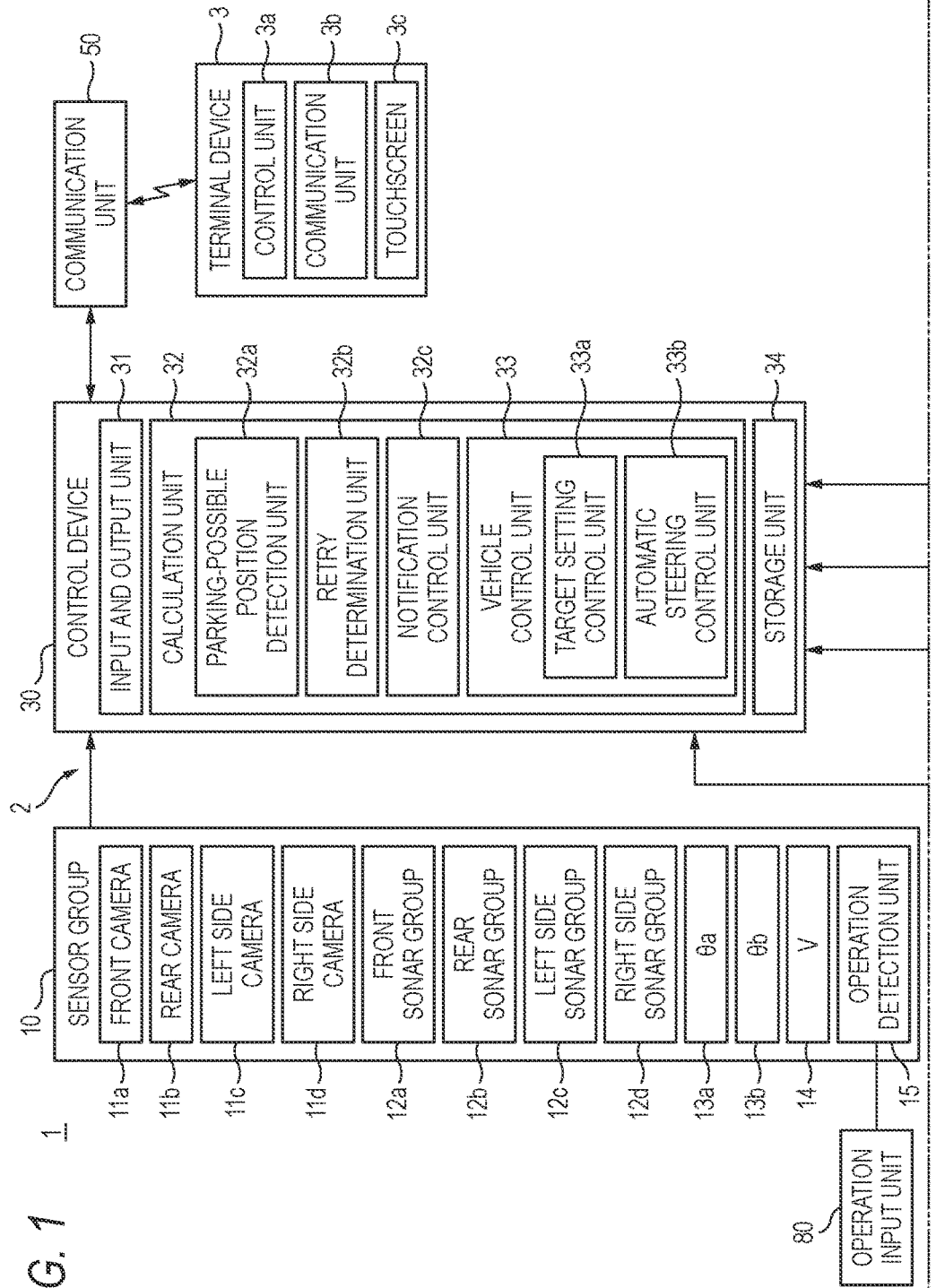
FIG. 1 is a block diagram showing a schematic configuration of a movement control system according to an embodiment.

An embodiment of a control device and a movement control system of the present disclosure will be described in detail with reference to the drawings. In the following description, an example in which a moving object according to the present disclosure is a vehicle will be described. In the present specification and the like, in order to simplify and clarify the description, each direction such as front, rear, left, right, upper, and lower is described according to a direction viewed from a driver of the vehicle. Further, in the following description, the same or similar elements are denoted by the same or similar reference numerals, and description thereof may be omitted or simplified as appropriate.

[Movement Control System]

A movement control system 1 according to the present embodiment shown in FIG. 1 is a system that includes a vehicle 2 and a terminal device 3 that can communicate with each other, and that moves the vehicle 2 to a predetermined target parking position by automatic steering by remote control using the terminal device 3 to park the vehicle 2 at the target parking position. Hereinafter, moving the vehicle 2 to the target parking position by the automatic steering to park the vehicle 2 at the target parking position by the remote control using the terminal device 3 is also referred to as "automatic parking".

[Vehicle]

The vehicle 2 is an automobile including a drive source, and wheels (both not shown) including driven wheels driven by power of the drive source and turnable turning wheels. For example, the vehicle 2 is a four-wheeled automobile including a pair of left and right front wheels and a pair of left and right rear wheels. The drive source of the vehicle 2 may be an electric motor, an internal combustion engine such as a gasoline engine or a diesel engine, or a combination of the electric motor and the internal combustion engine. Further, the drive source of the vehicle 2 may drive a pair of left and right front wheels, a pair of left and right rear wheels, or four wheels including the pair of left and right front wheels and rear wheels. Any one of the front wheels and the rear wheels may be turnable turning wheels, or both of the front wheels and the rear wheels may be turnable turning wheels.

As shown in FIG. 1, the vehicle 2 includes a sensor group 10, a navigation device 20, a control device 30, an EPS system (electric power steering system) 40, a communication unit 50, a driving force control system 60, and a braking force control system 70.

The sensor group 10 acquires various detection values related to the vehicle 2 or surroundings of the vehicle 2. The detection values acquired by the sensor group 10 are provided for, for example, the above-described automatic parking. The sensor group 10 includes a front camera 11a, a rear camera 11b, a left side camera 11c, a right side camera 11d, a front sonar group 12a, a rear sonar group 12b, a left side sonar group 12c, and a right side sonar group 12d. The cameras and the sonar groups can function as external sensors that acquire information on the surroundings of the vehicle 2.

The front camera 11a, the rear camera 11b, the left side camera 11c, and the right side camera 11d output, to the control device 30, image data of surrounding images obtained by capturing images of the surroundings of the vehicle 2. The surrounding images captured by the front camera 11a, the rear camera 11b, the left side camera 11c, and the right side camera 11d are referred to as a front image, a rear image, a left side image, and a right side image, respectively. An image including the left side image and the right side image is also referred to as a side image.

The front sonar group 12a, the rear sonar group 12b, the left side sonar group 12c, and the right side sonar group 12d emit sound waves to the surroundings of the vehicle 2, and receive reflected sounds from other objects. The front sonar group 12a includes, for example, four sonars. The sonars that constitute the front sonar group 12a are provided on an obliquely left front side, a front left side, a front right side, and an obliquely right front side of the vehicle 2, respectively. The rear sonar group 12b includes, for example, four sonars. The sonars that constitute the rear sonar group 12b are provided on an obliquely left rear side, a rear left side, a rear right side, and an obliquely right rear side of the vehicle 2, respectively. The left side sonar group 12c includes, for example, two sonars. The sonars that constitute the left side sonar group 12c are provided on a front side of a left side portion and a rear side of the left side portion of the vehicle 2, respectively. The right side sonar group 12d includes, for example, two sonars. The sonars that constitute the right side sonar group 12d are provided on a front side of a right side portion and a rear side of the right side portion of the vehicle 2, respectively.

The sensor group 10 further includes wheel sensors 13a and 13b, a vehicle speed sensor 14, and an operation detection unit 15. The wheel sensors 13a and 13b detect rotation angles of the wheels (not shown), respectively. The wheel sensors 13a and 13b may be configured with angle sensors or displacement sensors. The wheel sensors 13a and 13b output detection pulses each time the wheels are rotated by a predetermined angle. The detection pulses output from the wheel sensors 13a and 13b can be used for calculating the rotation angle of the wheels and a rotation speed of the wheels. A moving distance of the vehicle 2 can be calculated based on the rotation angle of the wheels. The wheel sensor 13a detects, for example, a rotation angle $\theta a$ of the left rear wheels. The wheel sensor 13b detects, for example, a rotation angle $\theta b$ of the right rear wheels.

The vehicle speed sensor 14 detects a traveling speed of a vehicle body (not shown) of the vehicle 2, that is, a vehicle speed V, and outputs the detected vehicle speed V to the control device 30. The vehicle speed sensor 14 detects the vehicle speed V based on, for example, rotation of a countershaft of transmission.

The operation detection unit 15 detects a content of an operation by a user performed by using an operation input unit 80, and outputs the detected operation content to the control device 30. The operation input unit 80 can include, for example, an operation button for receiving an operation for executing the automatic parking. The operation input unit 80 may be shared with a touchscreen 21 described later. Further, the operation input unit 80 may include a shift lever (a select lever, a selector) used when switching among a forward movement, a reverse movement, and parking of the vehicle 2. The automatic parking may be executed on a condition that the shift lever is in a parking position.

The navigation device 20 detects a current position of the vehicle 2 by using, for example, a global positioning system (GPS), and guides the user of the vehicle 2 (hereinafter, also simply referred to as "user") to a route to a destination. The navigation device 20 includes a storage device (not shown) provided with a map information database.

The touchscreen 21 and a speaker 22 are provided in the navigation device 20. The touchscreen 21 functions as an input device that receives an input of various pieces of information to the control device 30, and a display device controlled by the control device 30. That is, the user can input various commands to the control device 30 via the touchscreen 21. Further, various screens (for example, a screen for guiding a route to the destination) can be displayed on the touchscreen 21.

The speaker 22 outputs various pieces of guidance information to the user by a voice. As an example, during the automatic parking, the voice guidance may be performed via the speaker 22. Specifically, start of movement of the vehicle 2 may be performed by the voice guidance via the speaker 22 before start of the movement of the vehicle 2 along with the start of the automatic parking.

The control device 30 is an example of the control device of the present disclosure, and integrally controls the entire vehicle 2. For example, the control device 30 is configured to communicate with the terminal device 3 (for example, the terminal device 3 carried by the user who gets off the vehicle 2) outside the vehicle 2 via the communication unit 50 described later, and performs the automatic parking of moving the vehicle 2 to the target parking position by the automatic steering in response to a predetermined operation (for example, a traveling operation described later) being performed on the terminal device 3.

The control device 30 includes an input and output unit 31, a calculation unit 32, and a storage unit 34. The input and output unit 31 is an interface that inputs and outputs data (information) between an inside and an outside of the control device 30 under control of the calculation unit 32. The storage unit 34 is configured with, for example, anonvolatile storage medium such as a flash memory, and stores various pieces of information (for example, data and a program) for controlling an operation of the vehicle 2. The calculation unit 32 is configured with, for example, a central processing unit (CPU), and controls the units by executing the program stored in the storage unit 34. Accordingly, the above-described automatic parking is implemented.

The calculation unit 32 includes, as functional units related to the automatic parking, a parking-possible position detection unit 32a, a retry determination unit 32b, a notification control unit 32c, and a vehicle control unit 33. Further, here, the vehicle control unit 33 includes a target setting control unit 33a and an automatic steering control unit 33b.

Figure 2:
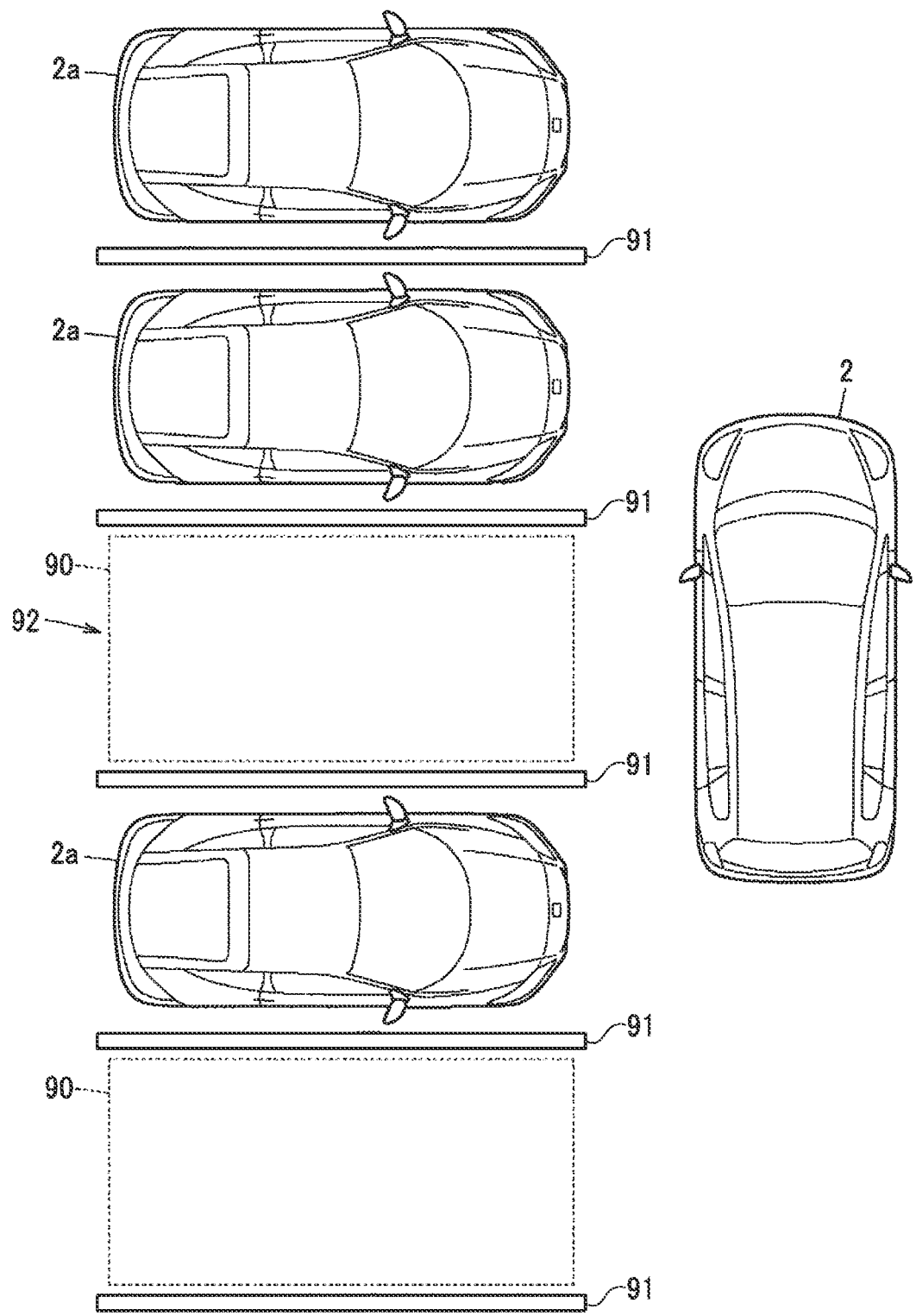
FIG. 2 is a diagram showing an example of a parking-possible position.

The parking-possible position detection unit 32a detects a parking-possible position where the vehicle 2 can be parked based on a detection result of the sensor group 10 in response to, for example, receiving an operation for executing the automatic parking. For example, as shown in FIG. 2, it is assumed that there are five parking spaces partitioned by white lines 91, other vehicles 2a are parked in three parking spaces among these five parking spaces, and other vehicles 2a are not parked in the remaining two parking spaces indicated by reference numerals 90 in FIG. 2. In such a case, the parking-possible position detection unit 32a detects, as the parking-possible positions, the parking spaces indicated by the reference numerals 90 in FIG. 2 where other vehicles 2a are not parked.

The parking-possible position detection unit 32a may also detect, as the parking-possible position, a place other than the parking spaces partitioned by the white lines 91 or the like. As an example, the parking-possible position detection unit 32a may detect, as the parking-possible position, any place set by the user as the parking-possible position. As another example, the parking-possible position detection unit 32a may detect, as the parking-possible position, any place where the vehicle 2 can be physically parked.

The target setting control unit 33a sets, as a target parking position 92, any one of parking-possible positions among parking-possible positions detected by the parking-possible position detection unit 32a. Specifically, the target setting control unit 33a sets, as the target parking position 92, a parking-possible position designated by the user among the detected parking-possible positions. In the example shown in FIG. 2, a parking space (parking-possible position) directly to a left side of the vehicle 2 is set as the target parking position 92.

For example, the control device 30 causes the touchscreen 21 to display a parking-possible position image showing the parking-possible position detected by the parking-possible position detection unit 32a. Here, the parking-possible position image can be, for example, a frame image representing an outline of a detected parking-possible position. When there is an operation of tapping any one of parking-possible position images among parking-possible position images displayed on the touchscreen 21 in this way, the target setting control unit 33a sets, as the target parking position 92, a parking-possible position shown by the tapped parking-possible position image.

After the target parking position 92 is set, the automatic steering control unit 33b automatically operates a steering 46 based on a current position of the vehicle 2 and the target parking position 92 such that the vehicle 2 is moved to the target parking position 92 in response to a predetermined operation (for example, the traveling operation described later) being performed on the terminal device 3. Accordingly, the vehicle 2 is moved to the target parking position 92 by the automatic steering. The automatic operation of the steering 46 is performed by, for example, the EPS system 40 described later controlling an EPS motor 43.

When the vehicle 2 is moved to the target parking position 92 by the automatic steering (that is, during the automatic parking), the retry determination unit 32b determines whether to execute retry control of moving the vehicle 2 again to the target parking position 92 after a traveling direction of the vehicle 2 is temporarily reversed based on the current position of the vehicle 2 and the target parking position 92. Here, the retry control is, for example, control for causing the vehicle 2 to perform so-called "turning back".

For example, when it is assumed that the entire vehicle 2 cannot be put into the target parking position 92 unless the vehicle 2 turns back based on a positional relationship between the current position of the vehicle 2 and the target parking position 92, a maximum steering angle of the steering 46, or the like, the retry determination unit 32b determines to execute the retry control. A condition for the retry determination unit 32b to determine to execute the retry control, that is, an execution condition of the retry control may be freely determined by a manufacturer of the vehicle 2 or the like.

Based on a determination result of the retry determination unit 32b, the notification control unit 32c transmits a retry notification including information indicating that the retry control is to be executed to the terminal device 3 via the communication unit 50 described later. More specifically, the notification control unit 32c transmits the retry notification to the terminal device 3 when it is determined that the retry control needs to be executed after at least a part of the vehicle 2 reaches the target parking position 92. In contrast, the notification control unit 32c does not transmit the retry notification to the terminal device 3 when it is determined that the retry control needs to be executed before at least a part of the vehicle 2 reaches the target parking position 92. The retry notification is information that triggers the terminal device 3 to display a retry confirmation screen G2 described later, and includes, for example, information indicating that the retry control is executed, information indicating the positional relationship between the vehicle 2 and the target parking position 92, and information indicating the traveling direction of the vehicle 2 reversed by the retry control. Accordingly, based on the retry notification received from the control device 30, the terminal device 3 can display the retry confirmation screen G2 described later.

Figure 3:
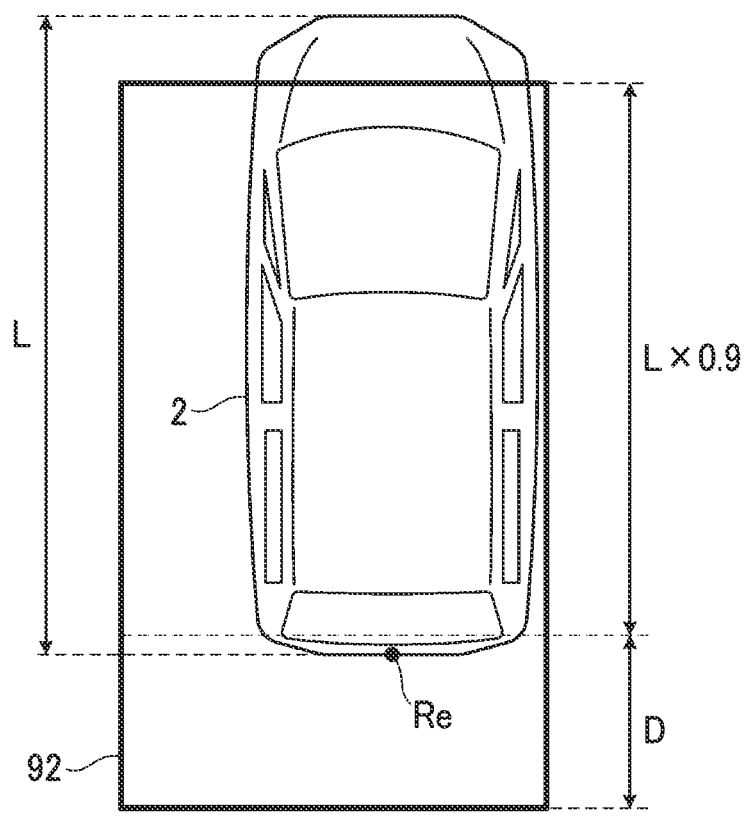
FIG. 3 is a diagram showing a specific example of a case where it is determined that retry control is executed in retry determination.

For example, as shown in FIG. 3, it is assumed that automatic parking in which the vehicle 2 is parked backward (so-called "backward-parked") at the target parking position 92 is executed. In this case, when it is determined that the retry control is executed in a state where a rear end of the vehicle 2 (see a reference numeral Re in FIG. 3) is within a retry determination distance D from a rear end of the target parking position 92, the notification control unit 32c transmits the retry notification. In contrast, when it is determined that the retry control is executed in a state where the rear end of the vehicle 2 is not within the retry determination distance D, the notification control unit 32c does not transmit the retry notification. Here, as the retry determination distance D, for example, as shown in FIG. 3, a distance such that a portion of 90% or more of an entire length L of the vehicle 2 is within the target parking position 92 can be set. A condition of whether to transmit the retry notification including the retry determination distance D is not limited to the example described here, and may be freely determined by the manufacturer of the vehicle 2 or the like.

Although illustration is omitted, in a case where the automatic parking in which the vehicle 2 is parked forward (so-called "forward-parked") at the target parking position 92 is executed, when it is determined that the retry control is executed in a state where a front end of the vehicle 2 is within the retry determination distance D, the notification control unit 32c transmits the retry notification. In contrast, when it is determined that the retry control is executed in a state where the front end of the vehicle 2 is not within the retry determination distance D, the notification control unit 32c does not transmit the retry notification.

The EPS system 40 includes a steering angle sensor 41, a torque sensor 42, the EPS motor 43, a resolver 44, and an EPS electronic control unit (EPS ECU) 45. The steering angle sensor 41 detects a steering angle θst of the steering 46. The torque sensor 42 detects a torque TQ applied to the steering 46.

The EPS motor 43 enables operation assistance of the steering 46 by the driver and the automatic steering during the automatic parking by applying a driving force or a reaction force to a steering column 47 coupled to the steering 46. The resolver 44 detects a rotation angle θm of the EPS motor 43. The EPS ECU 45 controls the entire EPS system 40. The EPS ECU 45 includes an input and output unit, a calculation unit, and a storage unit (none of which are shown).

The communication unit 50 is a communication interface that performs wireless communication with the terminal device 3 under control of the control device 30. That is, the control device 30 can communicate with the terminal device 3 via the communication unit 50. The terminal device 3 is, for example, an information terminal such as a smartphone carried by the user. For example, Wi-Fi (registered trademark), Bluetooth (registered trademark), or the like can be adopted for the wireless communication between the vehicle 2 and the terminal device 3. Further, the communication unit 50 may be configured to also communicate with a device other than the terminal device 3, for example, a predetermined base station or a server device.

The driving force control system 60 includes a driving ECU 61. The driving force control system 60 executes driving force control of the vehicle 2. The driving ECU 61 controls a driving force of the vehicle 2 by controlling an engine (not shown) or the like in response to an operation of the user on an accelerator pedal (not shown). Further, the driving force control system 60 controls the driving force of the vehicle 2 during the automatic parking such that the vehicle 2 is moved to the target parking position 92 in response to a predetermined operation (for example, the traveling operation described later) being performed on the terminal device 3.

The braking force control system 70 includes a braking ECU 71. The braking force control system 70 executes braking force control of the vehicle 2. The braking ECU 71 controls the braking force of the vehicle 2 by controlling a brake mechanism (not shown) or the like in response to an operation of the user on a brake pedal (not shown). Further, the braking force control system 70 controls the braking force of the vehicle 2 during the automatic parking such that the vehicle 2 is stopped on the spot, for example, when the traveling operation described later is not performed for a predetermined period.

[Terminal Device]

The terminal device 3 includes a control unit 3a, a communication unit 3b, and a touchscreen 3c. The control unit 3a functions as a control device that integrally controls the entire terminal device 3. The control unit 3a is implemented by, for example, an electronic circuit including a CPU or a microprocessor, and controls the entire terminal device 3 according to a program prepared in advance.

The communication unit 3b is a communication interface that performs wireless communication with the vehicle 2 under control of the control unit 3a. That is, the terminal device 3 can communicate with the control device 30 via the communication unit 3b.

The touchscreen 3c functions as an input device that receives an input of various pieces of information to the terminal device 3, and a display device controlled by the control unit 3a. That is, the user can input various commands to the terminal device 3 via the touchscreen 3c. Further, various screens are displayed on the touchscreen 3c. For example, during the automatic parking, a traveling operation reception screen G1 shown in FIG. 4, the retry confirmation screen G2 shown in FIG. 5, and an end screen G3 shown in FIG. 6 can be displayed on the touchscreen 3c.

(Traveling Operation Reception Screen)

Figure 4:
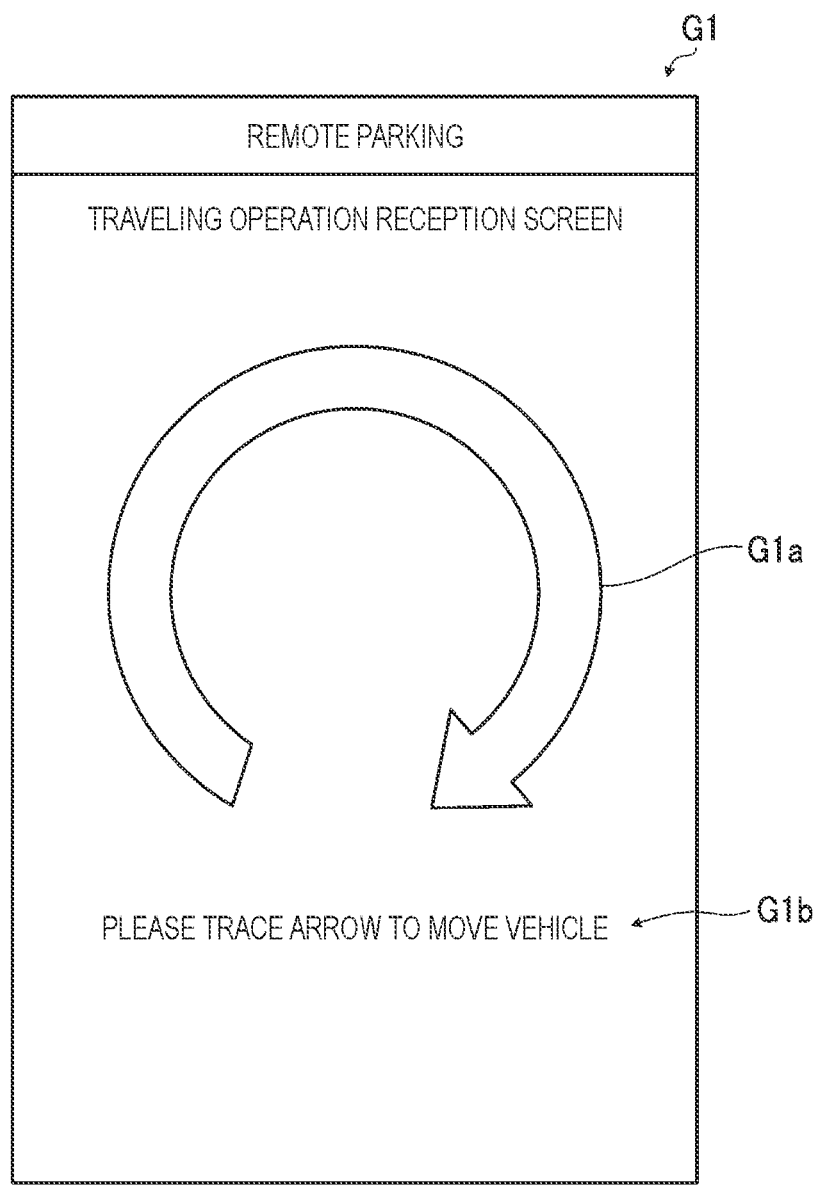
FIG. 4 is a diagram showing an example of a traveling operation reception screen displayed by a terminal device of the movement control system according to the embodiment.

As shown in FIG. 4, on a traveling operation reception screen G1, for example, an arc-shaped arrow image G1a is largely displayed at a screen center, and traveling operation guidance information G1b for guiding an operation (hereinafter, also referred to as "traveling operation") for causing the vehicle 2 to travel (that is, to move) is displayed below the arrow image G1a. The arrow image G1a shows a position and a direction to be traced by a fingertip of the user. In the present embodiment, an operation of tracing the position shown by the arrow image G1a with the fingertip in the direction shown by the arrow image G1a is set as the traveling operation. Therefore, as the traveling operation guidance information G1b, a message such as "please trace arrow to move vehicle" is displayed. It is possible to guide the user to the traveling operation in an intuitive and easy-to-understand way by displaying such a traveling operation reception screen G1 on the terminal device 3. When there is the operation of tracing the position shown by the arrow image G1a (a portion where the arrow image G1a is displayed) in the direction shown by the arrow image G1a, the terminal device 3 receives the operation as the traveling operation.

(Retry Confirmation Screen)

Figure 5:
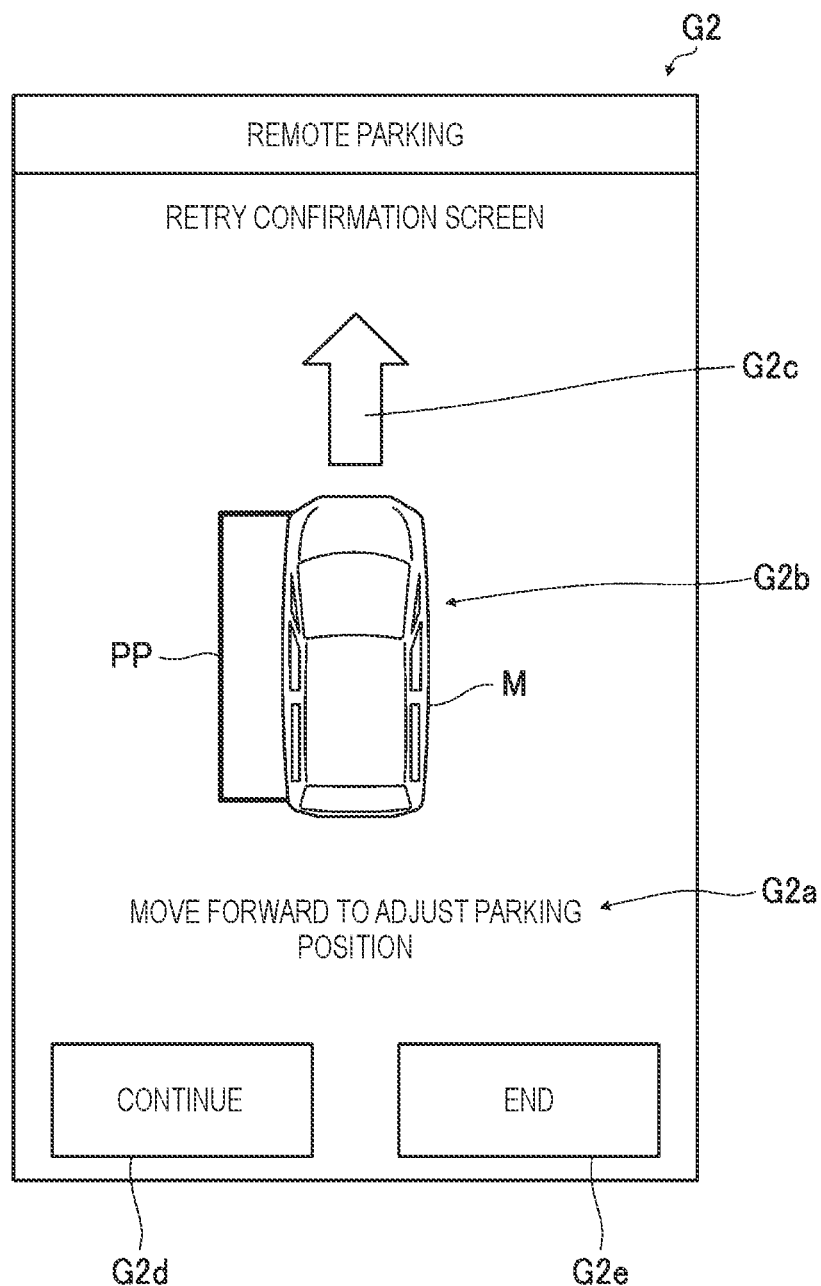
FIG. 5 is a diagram showing an example of a retry confirmation screen displayed by the terminal device of the movement control system according to the embodiment.

As shown in FIG. 5, information G2a indicating that the retry control is executed (hereinafter, also referred to as "retry control execution information"), information G2b indicating the positional relationship between the vehicle 2 and the target parking position 92 (hereinafter, also referred to as "positional relationship information"), and information G2c indicating a traveling direction of the vehicle 2 reversed by the retry control (hereinafter, also referred to as "traveling direction information") are displayed on a retry confirmation screen G2.

In the example shown in FIG. 5, as the retry control execution information G2a, a message such as "move forward to adjust parking position" is displayed. When the vehicle 2 is temporarily moved forward while executing the retry control, that is, when executing the automatic parking in which the vehicle 2 is parked backward at the target parking position 92, such retry control execution information G2a can be displayed.

In the example shown in FIG. 5, as the positional relationship information G2b, an image showing a state where an image M of the vehicle 2 is slightly shifted to a right side with respect to an image PP showing the target parking position 92 is displayed. Such positional relationship information G2b can be displayed when the vehicle 2 is slightly shifted to the right side with respect to the target parking position 92 (for example, when a right side portion of the vehicle 2 is not within the target parking position 92).

In the example shown in FIG. 5, as the traveling direction information G2c, an image of an arrow that extends forward from near a front end of the image M of the vehicle 2 is displayed. Such traveling direction information G2c can be displayed when the vehicle 2 is temporarily moved forward while executing the retry control, that is, when the automatic parking in which the vehicle 2 is parked backward at the target parking position 92 is executed. It is possible to guide the user to behavior of the vehicle 2 by the retry control by displaying such a retry confirmation screen G2 on the terminal device 3.

A continuation button G2d and an end button G2e are displayed on the retry confirmation screen G2. When there is an operation of tapping the continuation button G2d, the terminal device 3 receives the operation as an operation of permitting execution of the retry control (hereinafter, also referred to as "permission operation"). In contrast, when there is an operation of tapping the end button G2e, the terminal device 3 receives the operation as an operation of ending the automatic parking (hereinafter, also referred to as "end operation"). The terminal device 3 that receives the end operation displays, for example, the end screen G3 shown in FIG. 6 on the touchscreen 3c.

(End Screen)

Figure 6:
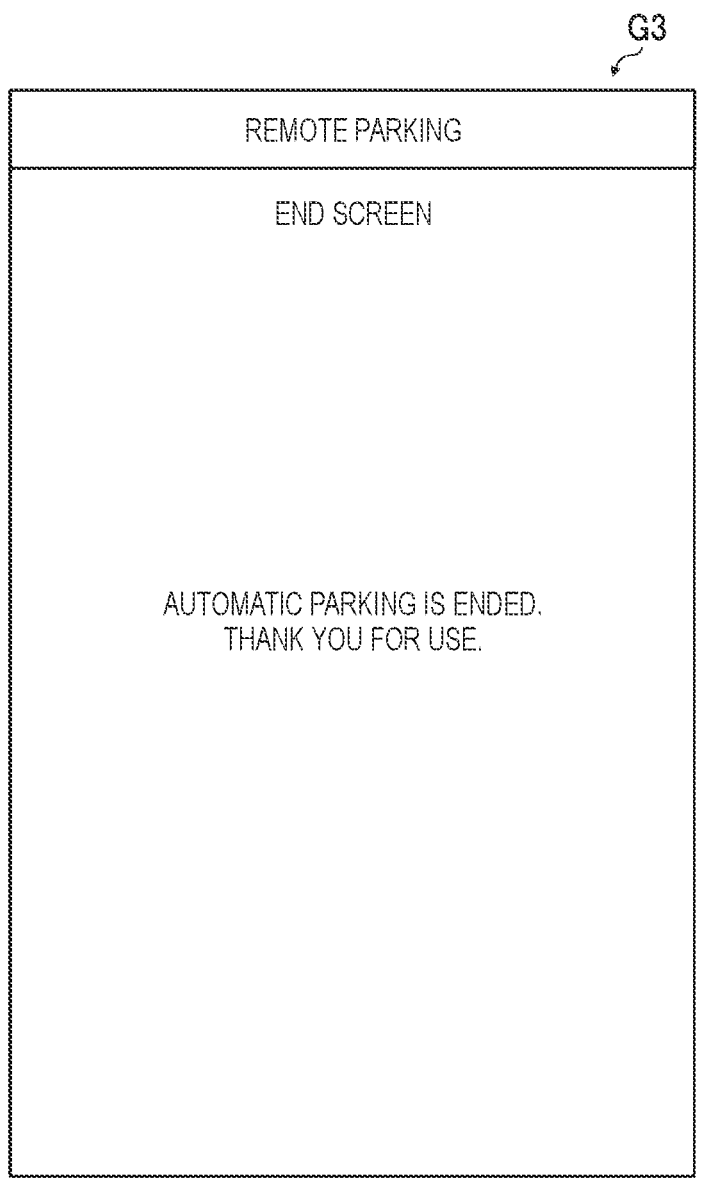
FIG. 6 is a diagram showing an example of an end screen displayed by the terminal device of the movement control system according to the embodiment.

As shown in FIG. 6, information indicating that the automatic parking is ended is displayed on the end screen G3. In the example shown in FIG. 6, as information indicating that the automatic parking has ended, a message such as "Automatic parking is ended. Thank you for use." is displayed. It is possible to explicitly indicate to the user that the automatic parking is ended by displaying such an end screen G3 on the terminal device 3.

[Display Control Processing]

Next, an example of display control processing of the terminal device 3 will be described with reference to FIG. 7. For example, when the automatic parking is executed in the vehicle 2, the terminal device 3 repeatedly executes the display control processing shown in FIG. 7 in a predetermined period. The display control processing is performed by, for example, the CPU of the terminal device 3 executing a program stored in advance in a storage device such as a memory.

Figure 7:
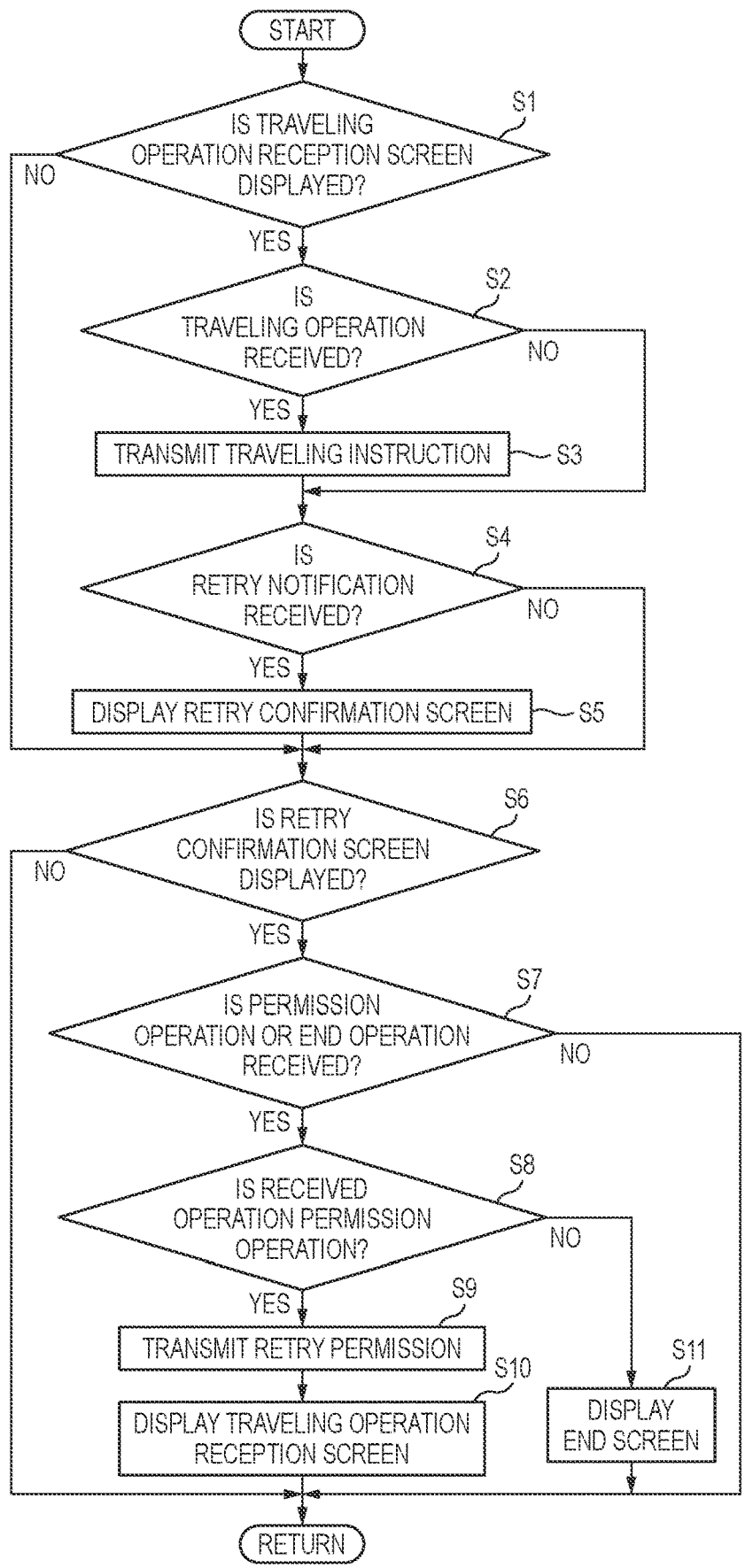
FIG. 7 is a flowchart showing an example of display control processing executed during automatic parking by the terminal device according to the embodiment.

As shown in FIG. 7, the terminal device 3 determines whether the traveling operation reception screen G1 is displayed on the touchscreen 3c (step S1). When the traveling operation reception screen G1 is not displayed (step S1: No), the terminal device 3 directly proceeds to processing of step S6. In contrast, when the traveling operation reception screen G1 is displayed (step S1: Yes), the terminal device 3 determines whether a traveling operation is received (step S2).

When not receiving the traveling operation (step S2: No), the terminal device 3 directly proceeds to processing of step S4. In contrast, when receiving the traveling operation (step S2: Yes), the terminal device 3 transmits a traveling instruction to the vehicle 2 (step S3).

Next, the terminal device 3 determines whether a retry notification is received from the vehicle 2 (step S4). When not receiving the retry notification (step S4: No), the terminal device 3 directly proceeds to the processing of step S6. In contrast, when receiving the retry notification (step S4: Yes), the terminal device 3 displays the retry confirmation screen G2 on the touchscreen 3c (step S5).

Next, the terminal device 3 determines whether the retry confirmation screen G2 is displayed on the touchscreen 3c (step S6). When the retry confirmation screen G2 is not displayed (step S6: No), the terminal device 3 directly ends a series of processing shown in FIG. 7. In contrast, when the retry confirmation screen G2 is displayed (step S6: Yes), the terminal device 3 determines whether a permission operation or an end operation is received (step S7).

When receiving none of the permission operation and the end operation (step S7: No), the terminal device 3 directly ends the series of processing shown in FIG. 7. In contrast, when receiving the permission operation or the end operation (step S7: Yes), the terminal device 3 determines whether the received operation is the permission operation (step S8).

When the received operation is the permission operation (step S8: Yes), the terminal device 3 transmits, to the vehicle 2, retry permission including information indicating that execution of the retry control is permitted (step S9). The terminal device 3 ends the display of the retry confirmation screen G2, displays the traveling operation reception screen G1 again (step S10), and ends the series of processing shown in FIG. 7. Accordingly, in this case, the user can move the vehicle 2 by performing the traveling operation again via the traveling operation reception screen G1 displayed again.

In contrast, when the received operation is not the permission operation, that is, when the received operation is the end operation (step S8: No), the terminal device 3 ends the display of the retry confirmation screen G2, displays the end screen G3 (step S11), and ends the series of processing shown in FIG. 7. That is, in this case, the retry permission is not transmitted, and the traveling operation reception screen G1 is also not displayed.

As described above, when receiving the retry notification, the terminal device 3 displays the retry confirmation screen G2 on which the permission operation can be received. However, here, the permission operation is an operation different from the traveling operation. As an example, in the present embodiment, the permission operation is an operation of tapping the continuation button G2d, and the traveling operation is an operation of tracing the arrow image G1a. In this way, it is possible to prevent the user who performs the traveling operation from unintentionally performing the permission operation as it is by setting the permission operation as an operation different from the traveling operation.

More specifically, during the automatic parking, an attention of the user is mainly directed to the vehicle 2, and the attention is difficult to be directed to the display of the terminal device 3. Therefore, even when the display of the terminal device 3 is changed from the traveling operation reception screen G1 to the retry confirmation screen G2, a case where the user does not notice the change immediately can be considered. In such a case, the user may perform the unintended permission operation while intending to perform the traveling operation. On the contrary, by setting the permission operation as an operation different from the traveling operation, it is possible to prevent a situation in which the user may perform the unintended permission operation while intending to perform the traveling operation from occurring.

When the end operation is received, since the end screen G3 different from the traveling operation reception screen G1 is displayed, the terminal device 3 can explicitly guide the user to a fact that the automatic parking is ended.

[Operation of Movement Control System]

Figure 8:
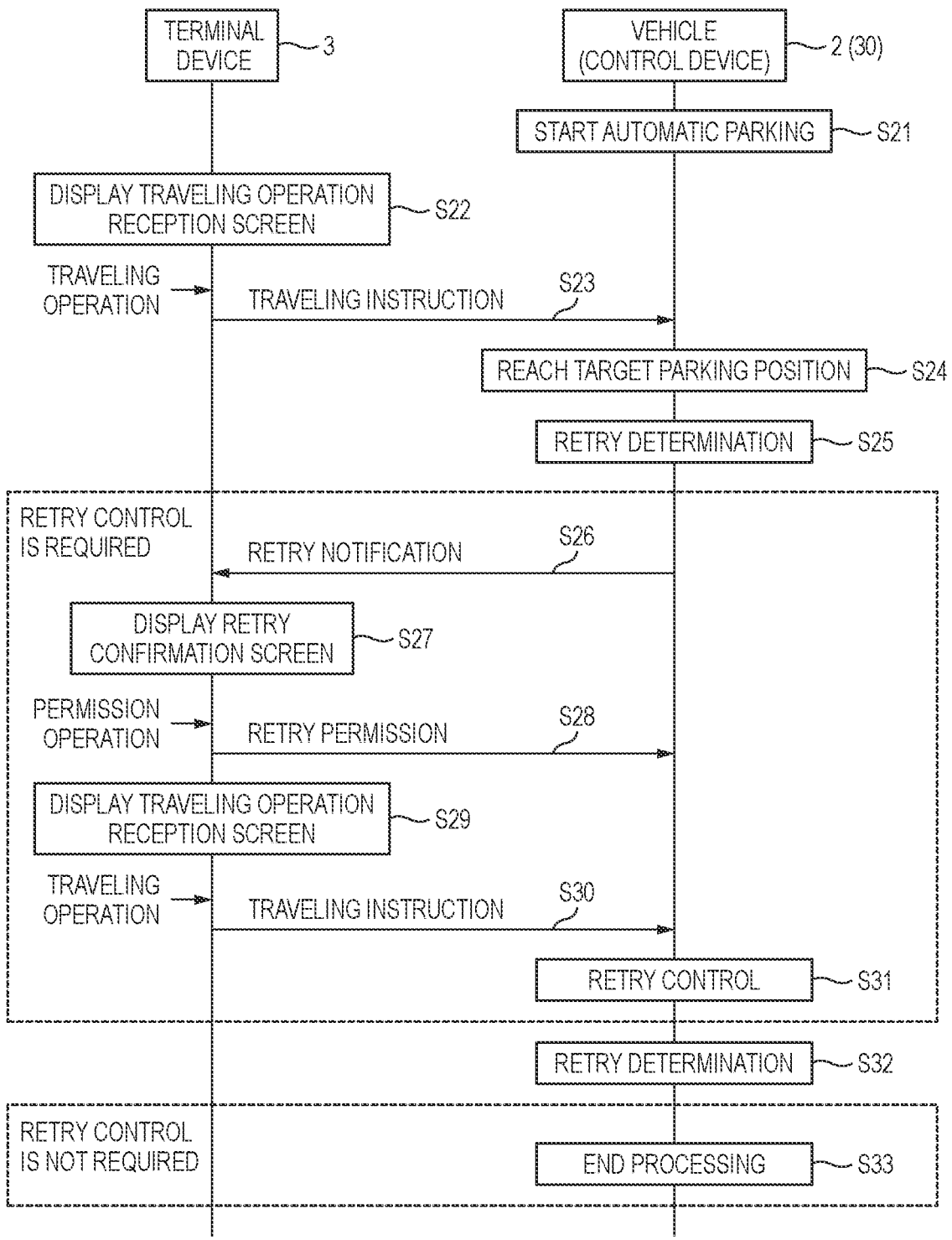
FIG. 8 is a flowchart showing an example of an operation of the movement control system according to the embodiment.

Next, an example of an operation of the movement control system 1 including the vehicle 2 and the terminal device 3 will be described with reference to FIG. 8.

First, the vehicle 2 (in other words, the control device 30, the same applies to the following description) starts the automatic parking in response to receiving an operation for executing the automatic parking (step S21). Further, the terminal device 3 displays the traveling operation reception screen G1 on the touchscreen 3c (step S22). Accordingly, the user can perform a traveling operation.

When receiving the traveling operation via the traveling operation reception screen G1, the terminal device 3 transmits a traveling instruction to the vehicle 2 (step S23). The vehicle 2 that receives the traveling instruction is moved toward the target parking position 92 by, for example, a predetermined distance or a predetermined time since the traveling instruction is received. Further, when moved toward the target parking position 92, the vehicle 2 executes a retry determination in a predetermined period.

Thereafter, it is assumed that at least a part of the vehicle 2 reaches the target parking position 92(step S24). In this way, it is assumed that retry control is determined to be executed by the retry determination (step S25) executed after at least the part of the vehicle 2 reaches the target parking position 92. In such a case, the vehicle 2 transmits a retry notification to the terminal device 3 (step S26).

The terminal device 3 that receives the retry notification displays the retry confirmation screen G2 on the touchscreen 3c (step S27). The traveling operation reception screen G1 is not displayed while displaying the retry confirmation screen G2. As a result, since a state where the user cannot perform the traveling operation is formed, the vehicle 2 is temporarily stopped. Since the vehicle 2 is stopped in this way, it is possible to suggest the user to confirm the display of the terminal device 3. Accordingly, even in a state where the attention of the user is directed to the vehicle 2 and the attention is difficult to be directed to the display of the terminal device 3, the user can notice that the retry confirmation screen G2 is displayed.

When receiving a permission operation via the retry confirmation screen G2, the terminal device 3 transmits retry permission to the vehicle 2 (step S28). Further, when receiving the permission operation, the terminal device 3 does not display the retry confirmation screen G2 on the touchscreen 3c and displays the traveling operation reception screen G1 on the touchscreen 3c again (step S29). Accordingly, the user can perform the traveling operation again.

When receiving the traveling operation via the traveling operation reception screen G1, the terminal device 3 transmits the traveling instruction to the vehicle 2 (step S30). When receiving the traveling instruction in this way after receiving the retry permission, the vehicle 2 executes the retry control (step S31). Thereafter, for example, when the entire vehicle 2 enters the target parking position 92 and the retry control is determined to be unnecessary by the retry determination (step S32), the vehicle 2 executes predetermined end processing (step S33) and ends (completes) a series of automatic parking. The end processing can include, for example, processing of turning off an ignition power supply of the vehicle 2, processing of storing side mirrors, and processing of locking doors.

As described above, according to the control device 30, during the automatic parking, when it is determined that the retry control is executed after at least a part of the vehicle 2 reaches the target parking position 92, the retry notification can be transmitted to the terminal device 3. In contrast, during the automatic parking, when it is determined that the retry control is executed before at least a part of the vehicle 2 reaches the target parking position 92, the retry notification cannot be transmitted to the terminal device 3. Accordingly, the retry notification is not transmitted to the terminal device 3 in a situation in which the user can easily predict that the retry control is to be executed even without the retry notification, so that it is possible to prevent excessive notifications that may bother the user. In contrast, the retry notification is transmitted to the terminal device 3 in a situation in which it is difficult for the user to predict whether the retry control is to be executed when there is no retry notification, so that it is possible to guide the user to a fact that the retry control is to be executed. Therefore, it is possible to issue a notification necessary for the user while preventing excessive notifications that may bother the user.

According to the control device 30, when it is determined that the retry control is executed after a portion of the entire length L of the vehicle 2 that is equal to or larger than a predetermined amount (for example, 90%) reaches the target parking position 92, the retry notification can be transmitted. In contrast, when it is determined that the retry control is executed before the portion of the entire length L of the vehicle 2 that is equal to or larger than the predetermined amount reaches the target parking position 92, the retry notification cannot be transmitted. Accordingly, the retry notification cannot be transmitted in the situation in which the user can easily predict that the retry control is to be executed even without the retry notification, and the retry notification can be transmitted in the situation in which it is difficult for the user to predict whether the retry control is to be executed when there is no retry notification. Therefore, it is possible to suppress a frequency at which the retry confirmation screen G2 is displayed on the terminal device 3 to minimum necessary, and to prevent a situation in which the user may feel bothered due to the retry confirmation screen G2 being unnecessarily displayed from occurring.

According to the control device 30, it is possible to transmit the retry notification for causing the touchscreen 3c of the terminal device 3 to display the retry confirmation screen G2 including the information indicating that the retry control is executed (retry control execution information G2a), the information indicating the positional relationship between the vehicle 2 and the target parking position 92 (positional relationship information G2b), and the information indicating the traveling direction of the vehicle 2 reversed by the retry control (traveling direction information G2c). Accordingly, by the retry confirmation screen G2 displayed on the terminal device 3 by the retry notification, it is possible to guide the user to the behavior of the vehicle 2 by the retry control.

According to the control device 30, when the retry permission including the information indicating that the execution of the retry control is permitted is received from the terminal device 3, the retry control can be executed as a response to the retry notification. Accordingly, since the retry control can be executed after waiting for the retry permission to be received from the terminal device 3, it is possible to prevent the retry control from being executed at a timing not intended by the user.

According to the control device 30, when the traveling instruction is received from the terminal device 3 after the retry permission is received, the retry control can be executed. Accordingly, after the retry permission is received, the retry control can be executed in response to the traveling operation being performed, and the retry control can be executed at a timing intended by the user.

According to the movement control system 1, when receiving the retry notification from the control device 30, the terminal device 3 displays the retry confirmation screen G2 on the touchscreen 3c, and when receiving the permission operation after the retry confirmation screen G2 is displayed, the terminal device 3 transmits the retry permission to the control device 30 and displays the traveling operation reception screen G1 for receiving the traveling operation on the touchscreen 3c. Accordingly, since the terminal device 3 displays the traveling operation reception screen G1 for receiving the traveling operation in response to there being the permission operation for transmitting the retry permission, it is possible to prevent the retry control from being executed due to the user unintentionally performing the traveling operation.

According to the movement control system 1, when receiving the retry notification from the control device 30 while displaying the traveling operation reception screen G1, the terminal device 3 ends the display of the traveling operation reception screen G1 and displays the retry confirmation screen G2. Accordingly, it is possible to prevent the retry control from being executed due to the user unintentionally performing the traveling operation.

According to the movement control system 1, since the permission operation is an operation different from the traveling operation, it is possible to prevent the user who performs the traveling operation from directly unintentionally performing the permission operation.

When movement to the target parking position 92 by the automatic steering (that is, the automatic parking) is started and then the movement is not completed within a predetermined period, the control device 30 may interrupt the movement. Accordingly, when the movement of the vehicle 2 to the target parking position 92 by the automatic steering is prolonged for some reason, it is possible to prompt the user to move the vehicle 2 to the target parking position 92 by a manual operation.

Although the embodiment of the present disclosure has been described above with reference to the accompanying drawings, it is needless to say that the present disclosure is not limited to the embodiment. It will be apparent to those skilled in the art that various changes and modifications may be conceived within the scope of the claims. It is also understood that the various changes and modifications belong to the technical scope of the present disclosure. Further, the constituent elements in the above-described embodiment may be freely combined without departing from the gist of the present disclosure.

For example, in the above-described embodiment, an example in which the moving object in the present disclosure is the vehicle 2 that is a four-wheeled automobile has been described, but the present disclosure is not limited thereto. The moving object in the present disclosure may be a two-wheeled automobile (so-called motorcycle), or may be a Segway (registered trademark), a ship, an aircraft, or the like.

In the present specification, at least the following matters are described. Although corresponding constituent elements and the like in the above-described embodiment are shown in parentheses, the present disclosure is not limited thereto.

(1) A control device (the control device 30) that is configured to communicate with a terminal device (the terminal device 3) outside a moving object (the vehicle 2), and that causes the moving object to move to a target position by automatic steering in response to a predetermined movement operation being performed on the terminal device, the control device including:

a retry determination unit (the retry determination unit 32b) configured to determine whether to execute retry control, which is for moving the moving object to the target position again after a traveling direction of the moving object is temporarily reversed, based on a current position of the moving object and the target position when the moving object is moved to the target position (the target parking position 92) by automatic steering; and a notification control unit (the notification control unit 32c) configured to transmit, to the terminal device, a retry notification including information indicating that the retry control is to be executed based on a determination result of the retry determination unit, in which the notification control unit transmits the retry notification to the terminal device w % ben it is determined that the retry control is executed after at least a part of the moving object reaches the target position, and in which the notification control unit does not transmit the retry notification to the terminal device when it is determined that the retry control is executed before at least a part of the moving object reaches the target position.

According to (1), the retry notification is transmitted to the terminal device when it is determined that the retry control is executed after at least a part of the moving object reaches the target position. In contrast, the retry notification is not transmitted to the terminal device when it is determined that the retry control is executed before at least a part of the moving object reaches the target position. Accordingly, the retry notification is not transmitted in a situation in which the user can easily predict that the retry control is to be executed even without the retry notification, so that it is possible to prevent excessive notifications that may bother the user. In contrast, the retry notification is transmitted in a situation in which it is difficult for the user to predict whether the retry control is to be executed when there is no retry notification, so that it is possible to guide the user to a fact that the retry control is to be executed. Therefore, it is possible to issue a notification necessary for the user while preventing excessive notifications that may bother the user.

(2) The Control Device According to (1), in which the notification control unit transmits the retry notification to the terminal device when it is determined that the retry control is executed after a portion of an entire length (the entire length L) of the moving object that is equal to or larger than a predetermined amount (for example, 90%) reaches the target position, and in which the notification control unit does not transmit the retry notification to the terminal device when it is determined that the retry control is executed before the portion equal to or larger than the predetermined amount reaches the target position.

According to (2), the retry notification cannot be transmitted in the situation in which the user can easily predict that the retry control is to be executed even without the retry notification, and the retry notification can be transmitted in the situation in which it is difficult for the user to predict whether the retry control is to be executed when there is no retry notification.

(3) The Control Device According to (1) or (2).
in which when movement of the moving object to the target position by automatic steering is started and then the movement is not completed within a predetermined period, the control device interrupts the movement.

According to (3), when the movement of the moving object to the target position by the automatic steering is prolonged for some reason, the movement is interrupted, so that it is possible to prompt the user to manually move the moving object to the target position.

(4) The Control Device According to any One of (1) to (3),
in which the control device transmits the retry notification for causing a display unit (the touchscreen 3c) of the terminal device to display a retry confirmation screen (the retry confirmation screen G2) including information indicating that the retry control is executed (the retry control execution information G2a), information indicating a positional relationship between the moving object and the target position (the positional relationship information G2b), and information indicating a traveling direction of the moving object reversed by the retry control (the traveling direction information G2c).

According to (4), by the retry confirmation screen displayed on the terminal device by the retry notification, it is possible to guide the user to behavior of the moving object by the retry control.

(5) The Control Device According to any One of (1) to (4),
in which when receiving, from the terminal device, retry permission including information indicating that execution of the retry control is permitted, the control device executes the retry control as a response to the retry notification.

According to (5), since the retry control is executed after the retry permission is received from the terminal device, it is possible to prevent the retry control from being executed at a timing not intended by the user.

(6) The Control Device According to (5),
in which the control device executes the retry control in response to the movement operation being performed after the retry permission is received.

According to (6), since the retry control is executed in response to the movement operation being performed after the retry permission is received, it is possible to execute the retry control at a timing intended by the user.

(7) A Movement Control System (the Movement Control System 1) Including: The Control Device According to (6); the moving object that is controlled by the control device, and that is configured to move to the target position by automatic steering in response to the movement operation being performed on the terminal device; and
the terminal device including a display unit (the touchscreen 3c) and configured to communicate with the control device,
in which the control device transmits, to the terminal device, the retry notification for causing the display unit to display a retry confirmation screen including information indicating that the retry control is executed, and
in which when receiving the retry notification, the terminal device displays the retry confirmation screen on the display unit, and when receiving a predetermined permission operation after the retry confirmation screen is displayed, the terminal device transmits the retry permission to the control device, and displays a movement operation reception screen (the traveling operation reception screen G1) for receiving the movement operation on the display unit.

According to (7), since the terminal device displays the movement operation reception screen for receiving the movement operation in response to there being the permission operation for transmitting the retry permission, it is possible to prevent the retry control from being executed due to the user unintentionally performing the movement operation.

(8) The Movement Control System According to (7),
in which when receiving the retry notification while displaying the movement operation reception screen, the terminal device ends display of the movement operation reception screen and displays the retry confirmation screen.

According to (8), when receiving the retry notification while displaying the movement operation reception screen, the terminal device ends the display of the movement operation reception screen and displays the retry confirmation screen, so that it is possible to prevent the retry control from being executed due to the user unintentionally performing the movement operation.

(9) The Movement Control System According to (7) or (8),
in which the permission operation is an operation different from the movement operation.

According to (9), since the permission operation is an operation different from the movement operation, it is possible to prevent a user who performs the movement operation from directly unintentionally performing the permission operation.

(10) The Movement Control System According to any One of (7) to (9),
in which when receiving a predetermined end operation after the retry confirmation screen is displayed, the terminal device does not transmit the retry permission to the control device, and displays an end screen (the end screen G3) different from the movement operation reception screen on the display unit.

According to (10), when there is the end operation of not transmitting the retry permission, the terminal device displays the end screen, so that it is possible to guide the user to a fact that the movement of the moving object to the target position by the automatic steering is ended.

The invention claimed is:
1. A control device that is configured to communicate with a terminal device outside a moving object, and that causes the moving object to move to a target position by automatic steering in response to a predetermined movement operation being performed on the terminal device, the control device comprising:
a retry determination unit configured to determine whether to execute retry control, which is for moving the moving object to the target position again after a traveling direction of the moving object is temporarily reversed, based on a current position of the moving object and the target position when the moving object is moved to the target position by automatic steering; and
a notification control unit configured to transmit a retry notification, including information indicating that the retry control is to be executed based on a determination result of the retry determination unit, to the terminal device, wherein:

the notification control unit transmits the retry notification to the terminal device when the retry control, executed after at least a part of the moving object reaches the target position, is determined; and the notification control unit does not transmit the retry notification to the terminal device when the retry control, executed before at least a part of the moving object reaches the target position, is determined.

2. The control device according to claim 1, wherein:

the notification control unit transmits the retry notification to the terminal device when it is determined that the retry control is executed after a portion of an entire length of the moving object that is equal to or larger than a predetermined amount reaches the target position; and the notification control unit does not transmit the retry notification to the terminal device when it is determined that the retry control is executed before the portion equal to or larger than the predetermined amount reaches the target position.

3. The control device according to claim 1, wherein when movement of the moving object to the target position by automatic steering is started and then the movement is not completed within a predetermined period, the control device interrupts the movement.

4. The control device according to claim 1, wherein the control device transmits the retry notification for causing a display unit of the terminal device to display a retry confirmation screen including information indicating that the retry control is executed, information indicating a positional relationship between the moving object and the target position, and information indicating a traveling direction of the moving object reversed by the retry control.

5. The control device according to claim 1, wherein when receiving, from the terminal device, retry permission including information indicating that execution of the retry control is permitted, the control device executes the retry control as a response to the retry notification.

6. The control device according to claim 5, wherein the control device executes the retry control in response to the movement operation being performed after the retry permission is received.

7. A movement control system comprising:

a control device that is configured to communicate with a terminal device outside a moving object, and that causes the moving object to move to a target position by automatic steering in response to a predetermined movement operation being performed on the terminal device, the control device including:

a retry determination unit configured to determine whether to execute retry control, which is for moving the moving object to the target position again after a traveling direction of the moving object is temporarily reversed, based on a current position of the moving object and the target position when the moving object is moved to the target position by automatic steering; and a notification control unit configured to transmit a retry notification, including information indicating that the retry control is to be executed based on a determination result of the retry determination unit, to the terminal device;

the moving object controlled by the control device, the moving object being configured to move to the target position by automatic steering in response to the movement operation being performed on the terminal device; and the terminal device including a display unit, the terminal device being configured to communicate with the control device, wherein:

the notification control unit transmits the retry notification to the terminal device when the retry control, executed after at least a part of the moving object reaches the target position, is determined;

the notification control unit does not transmit the retry notification to the terminal device when the retry control, executed before at least a part of the moving object reaches the target position, is determined;

when receiving, from the terminal device, retry permission including information indicating that execution of the retry control is permitted, the control device executes the retry control as a response to the retry notification;

the control device executes the retry control in response to the movement operation being performed after the retry permission is received;

the control device transmits, to the terminal device, the retry notification for causing the display unit to display a retry confirmation screen including information indicating that the retry control is executed; and when receiving the retry notification, the terminal device displays the retry confirmation screen on the display unit, and when receiving a predetermined permission operation after the retry confirmation screen is displayed, the terminal device transmits the retry permission to the control device, and displays a movement operation reception screen for receiving the movement operation on the display unit.

8. The movement control system according to claim 7, wherein when receiving the retry notification while displaying the movement operation reception screen, the terminal device ends display of the movement operation reception screen and displays the retry confirmation screen.

9. The movement control system according to claim 7, wherein the permission operation is an operation different from the movement operation.

10. The movement control system according to claim 7, wherein when receiving a predetermined end operation after the retry confirmation screen is displayed, the terminal device does not transmit the retry permission to the control device, and displays an end screen different from the movement operation reception screen on the display unit.

* * * * *